United States Patent
Zhang

(10) Patent No.: US 11,809,616 B1
(45) Date of Patent: Nov. 7, 2023

(54) TWIN POSE DETECTION METHOD AND SYSTEM BASED ON INTERACTIVE INDIRECT INFERENCE

(71) Applicant: Qing Zhang, Shanghai (CN)

(72) Inventor: Qing Zhang, Shanghai (CN)

( * ) Notice: Subject to any disclaimer, the term of this patent is extended or adjusted under 35 U.S.C. 154(b) by 0 days.

(21) Appl. No.: 18/339,186

(22) Filed: Jun. 21, 2023

(30) Foreign Application Priority Data

Jun. 23, 2022 (CN) .......................... 202210715227.9

(51) Int. Cl.

| G06F 3/01 | (2006.01) |
| G06T 7/73 | (2017.01) |
| G06F 3/0346 | (2013.01) |
| H04M 1/72448 | (2021.01) |

(52) U.S. Cl.
CPC ............ G06F 3/011 (2013.01); G06F 3/0346 (2013.01); G06T 7/73 (2017.01); *G06T 2207/20081* (2013.01); *G06T 2207/30196* (2013.01); *H04M 1/72448* (2021.01)

(58) Field of Classification Search
CPC .......... G06F 3/011; G06F 3/0346; G06T 7/73; G06T 2207/20081; G06T 2207/30196; H04M 1/72448
See application file for complete search history.

(56) References Cited

U.S. PATENT DOCUMENTS

| 9,094,576 | B1 * | 7/2015 | Karakotsios | ............ | G10L 15/02 |
| 9,144,744 | B2 * | 9/2015 | Langlois | ................. | A63F 13/28 |
| 10,416,755 | B1 * | 9/2019 | Erivantcev | ............. | G06V 10/82 |
| 10,796,104 | B1 * | 10/2020 | Lee | .......... | G06N 20/00 |
| 11,210,834 | B1 * | 12/2021 | Chamdani | ............... | G06T 13/40 |
| 11,232,294 | B1 * | 1/2022 | Banerjee | .................... | G06T 7/73 |
| 11,249,556 | B1 * | 2/2022 | Schwarz | ................. | G06F 3/011 |

(Continued)

FOREIGN PATENT DOCUMENTS

| CN | 108830150 B | 5/2019 |
| CN | 109791440 A | 5/2019 |

(Continued)

OTHER PUBLICATIONS

Xiang Gai et al.,"A simulating fracture manual reduction training system based on virtual reality technology", Military Medical Sciences, vol. 41, No. 11, Nov. 2017, pp. 912-916.

(Continued)

*Primary Examiner* — William Lu

(57) ABSTRACT

A method and system for twin pose detection based on interactive indirect inference. The method includes: acquiring, by sensors on a mobile phone, a data set in real time; and obtaining poses of individual parts of a skeleton of an object by reasoning using reasoners on individual parts based on the data set and a preferred way of the object for using the mobile phone; merging the poses to generate multiple initial virtual skeletons; under a predetermined human mechanics constraint, obtaining multiple overall virtual skeletons satisfying the predetermined human mechanics constraint from the initial virtual skeletons; and screening a predetermined number of overall virtual skeletons from the overall virtual skeletons, and obtaining a dynamic twin virtual pose in real time by reasoning on the predetermined number of overall virtual skeletons using an overall skeleton reasoner.

10 Claims, 9 Drawing Sheets

(56) References Cited

U.S. PATENT DOCUMENTS

| | | | |
|---|---|---|---|
| 11,281,293 B1 | 3/2022 | Hernández et al. | |
| 2010/0197390 A1* | 8/2010 | Craig | G06V 40/20 |
| | | | 463/30 |
| 2011/0085705 A1* | 4/2011 | Izadi | G06V 40/103 |
| | | | 382/103 |
| 2011/0304557 A1* | 12/2011 | Wilburn | G06F 3/0488 |
| | | | 715/702 |
| 2012/0225719 A1* | 9/2012 | Nowozin | G06F 3/017 |
| | | | 463/36 |
| 2013/0028517 A1* | 1/2013 | Yoo | G06V 40/107 |
| | | | 382/173 |
| 2013/0069931 A1* | 3/2013 | Wilson | G06V 40/20 |
| | | | 345/157 |
| 2013/0077820 A1* | 3/2013 | Marais | G06F 18/2148 |
| | | | 382/103 |
| 2013/0188081 A1* | 7/2013 | Kulas | G06F 3/048 |
| | | | 345/173 |
| 2013/0278501 A1* | 10/2013 | Bulzacki | G06F 18/2413 |
| | | | 345/157 |
| 2014/0035805 A1* | 2/2014 | Minnen | G06V 40/107 |
| | | | 345/156 |
| 2014/0195936 A1* | 7/2014 | Cragun | G06F 1/1694 |
| | | | 715/763 |
| 2014/0325373 A1* | 10/2014 | Kramer | G06F 3/0425 |
| | | | 715/740 |
| 2015/0032408 A1* | 1/2015 | Grenet | G01P 15/00 |
| | | | 702/141 |
| 2015/0077336 A1* | 3/2015 | Elangovan | G06F 3/014 |
| | | | 345/156 |
| 2015/0154447 A1* | 6/2015 | Wilson | G06T 7/248 |
| | | | 382/103 |
| 2015/0355462 A1* | 12/2015 | Saito | G02B 27/0093 |
| | | | 345/419 |
| 2016/0195940 A1* | 7/2016 | Hall | A63F 13/213 |
| | | | 345/158 |
| 2017/0118318 A1* | 4/2017 | Ma | H04M 1/027 |
| 2017/0273639 A1* | 9/2017 | Iscoe | G06N 20/00 |
| 2017/0308165 A1* | 10/2017 | Erivantcev | G06F 3/016 |
| 2018/0020978 A1* | 1/2018 | Kaifosh | G06F 3/017 |
| | | | 702/150 |
| 2019/0080252 A1* | 3/2019 | Shinn | G06F 8/30 |
| 2019/0114836 A1* | 4/2019 | Holzer | G06T 7/75 |
| 2019/0167059 A1* | 6/2019 | Brown | A47L 9/2857 |
| 2019/0197852 A1* | 6/2019 | Sadek | G07C 9/00 |
| 2019/0339766 A1* | 11/2019 | Erivantcev | G06F 3/0346 |
| 2020/0122326 A1 | 4/2020 | Masselin et al. | |
| 2021/0072548 A1* | 3/2021 | Kobayashi | G02B 27/0172 |
| 2021/0233273 A1* | 7/2021 | Spurr | G06V 20/647 |
| 2021/0241529 A1* | 8/2021 | Cowburn | H04N 7/157 |
| 2021/0271863 A1* | 9/2021 | Obinata | G06V 40/20 |
| 2021/0402942 A1* | 12/2021 | Torabi | B60W 50/14 |
| 2022/0245812 A1* | 8/2022 | Newman-Toker | A61B 5/4023 |
| 2022/0258049 A1* | 8/2022 | Kanani | G06Q 30/0621 |
| 2022/0410000 A1* | 12/2022 | Ohashi | A61B 5/11 |
| 2023/0127549 A1* | 4/2023 | Xu | G06V 40/11 |
| | | | 345/156 |

FOREIGN PATENT DOCUMENTS

| | | |
|---|---|---|
| CN | 109885163 A | 6/2019 |
| CN | 110472481 A | 11/2019 |
| CN | 110495889 A | 11/2019 |
| CN | 110502980 A | 11/2019 |
| CN | 110675474 A | 1/2020 |
| CN | 111311714 A | 6/2020 |
| CN | 112132955 A | 12/2020 |
| CN | 108876815 B | 3/2021 |
| CN | 112884780 A | 6/2021 |
| CN | 112926550 A | 6/2021 |
| CN | 113158459 A | 7/2021 |
| CN | 113191324 A | 7/2021 |
| CN | 113610969 A | 11/2021 |
| WO | 2022070781 A1 | 4/2022 |

OTHER PUBLICATIONS

Weiwei Yao et al.,"Railway Driver Behavior Recognition Based on Fusion Object Detection and Person Keypoints Detection", Computer Measurement & Control, vol. 28, No. 6, 2020, pp. 212-216.

Huaijin Zheng "A wireless human pose detection method based on digital twin and inertial sensor", IEEE, 2022, Entire document.

* cited by examiner

TWIN POSE DETECTION METHOD AND SYSTEM BASED ON INTERACTIVE INDIRECT INFERENCE

CROSS-REFERENCE TO RELATED APPLICATIONS

This application claims the benefit of priority from Chinese Patent Application No. 202210715227.9, filed on Jun. 23, 2022. The content of the aforementioned application, including any intervening amendments thereto, is incorporated herein by reference in its entirety.

TECHNICAL FIELD

This application relates to digital intelligence technology, and more particularly to a twin pose detection method and system based on interactive indirect inference. By means of the digital twin technology, the software empowerment and intelligent empowerment are achieved in the high-end manufacturing, and combined with the sensing device and intelligent device, there is no need to additionally provide collection and wearable devices, and the user can access virtual reality applications with physical interaction anywhere and anytime.

BACKGROUND

Sensor and assistive peripherals (such as specific smart wearable products and head-mounted displays (HMDs)) have long been used to build a bridge between the physical world and the virtual digital for users. The improved sensory coherence is what users and the industry have always pursued and worked towards. However, the experience limitations of current sensor peripherals and the compatibility problems between devices exist. For example, sensor peripherals provided by various hardware manufacturers are not the facilities used by universal consumers such that the virtual reality is difficult to popularize and the experience consistency is low.

The mobile smart terminals (e.g., mobile phones, tablets, smart wears) have a screen display, network communication and a certain degree of computing power characteristics, which are already popular and versatile. Providing a basic and universal method for detecting poses using these universal devices can greatly facilitate the versatility and universality of virtual reality. In this way, some specific sensor and assistive peripherals are not required, such as HMDs that have wearability and compatibility limitations, handles that occupy hands and have convenience limitations, additional camera image capture that rely on place and camera equipment, and wearable pose positioners that are not available anywhere and anytime, limited in space, specialist and expensive.

The above objectively depicts the current situation of the popularity and real-time nature of virtual reality and introduces a basic method for pose detection of twin that can be built through mobile smart terminals. This application provides a method and system for detecting poses of twin based on interactive indirect inference, which enables software empowerment and intelligent empowerment through the digital intelligence technologies (digital twin technology) in high-end manufacturing, and enables ordinary users to access virtual reality applications anytime and anywhere through sensing devices and smart devices without external assistive acquisition and wearable devices.

Chinese Patent Publication No. 113610969A (Application No. 202110974124.X) discloses a method for generating a three-dimensional (3D) human body model, including: acquiring to-be-detected images taken from a plurality of perspectives; detecting human body regions contained in the to-be-detected images, and detecting a data set of skeletal key points contained in the human body regions; constructing a fusion affinity matrix between the to-be-detected images by using the human body regions and the data set of skeletal key points; determining a matching relationship between the body regions by using the fusion affinity matrix; performing pose construction based on the matching relationship and the data set of skeletal key points to generate the 3D human body model. The method can analyze human pose from various perspectives, extract the data of body regions and skeletal key points from the to-be-detected images, generate a 3D human body model by using the matching relationship between body regions and the data set of skeletal key points, and thus can fully and effectively restore the 3D poses of human body. The method relies on sensors and multiple perspectives, which is different from the indirect inference of the method provided by the present disclosure.

Chinese Patent Publication No. 111311714A (Application No. 202010244300.X) discloses a method and system for pose prediction. The method includes: acquiring pose information of a target character in one or more existing frames; and inputting the pose information into a trained pose prediction model to determine predicted pose information of the target character in subsequent frames, where the pose information includes skeletal rotation angle information and gait movement information. This method is different from the method of the present disclosure in objectives, and detection techniques.

Chinese Patent Publication No. 112132955A (Application No. 202010902457.7) discloses a digital twin construction method for human skeleton. In this method, data at important locations of the human body is acquired via VR motion capture and sensor technology. Key data is obtained through data classification, screening, simplification and calculation via artificial intelligence. The spatial orientation and mechanical information of the target skeleton is obtained by solving the key data with human inverse dynamics and biomechanical algorithms. After fusing some of the sensor data with the computational results, simulation is performed on the target skeleton to obtain the biomechanical properties of the target skeleton and predict the biomechanical properties of the target skeleton in unknown poses using various prediction algorithms. Finally, the performance data is subjected to modelling and rendering to obtain a high-fidelity digital twin of the real skeleton, achieving a faithful twin mapping of the biomechanical properties of the skeleton. In this disclosure, sensors and external sensing of VR devices are used. Given that these devices per se can greatly get direct sensing data to complete the pose detection, which is entirely different from the interactive indirect inference proposed in the present disclosure. What is more different is that in the present disclosure, inference engines are designed according to different parts to ensure targeted inference detection.

Chinese Patent Publication No. 110495889A (Application No. 201910599978.7) discloses a method of pose assessment, an electronic device, a computer device and a storage medium. The method includes: obtaining to-be-tested images, where the to-be-tested images include a front full body image and a side full body image of a tester standing upright; extracting skeletal key points from the to-be-tested images; calculating, based on the skeletal key points, a pose vector of the tester; and obtaining a bending angle of the pose vector. This method relies on sensors and multiple perspectives, which is different from the indirect inference of the present disclosure.

Chinese Patent Publication No. 113191324A (Application No. 202110565975.9) discloses a method for predicting pedestrian behavioral intention based on multi-task learning, including: constructing a training sample set; constructing a pedestrian behavioral intention prediction model using a base network, a pose detection network and an intention recognition network; and extracting image features to obtain a feature map with a single frame image of the training sample set as an input of the base network. An encoder of the pose detection network includes a part intensity field sub-network and a part association field sub-network. Pedestrian pose images are acquired by a decoder of the pose detection network according to the joint feature map and the bone feature map, where the feature map is set as an input of both the part intensity field sub-network and the part association field sub-network, a joint feature map and a bone feature map are set as an output of the part intensity field sub-network and the part association field sub-network, respectively. The feature map is set as an input of the intension recognition network, and the pedestrian behavioral intention image is set as an output of the intension recognition network. The pedestrian behavioral intention prediction model is trained and used to predict the pedestrian behavioral intention. This method relies on sensors and image feature extraction, which differs from the indirect inference of the present disclosure and produce different results.

Chinese Patent Publication No. 112884780A (Application No. 202110165636.1) discloses a method and system for estimating poses of human body, including: inputting and training an image in a codec network having a four-layer coding layer and a four-layer decoding layer structure, and outputting a semantic segmentation result; converting a semantic probability map of a pixel obtained in the former two coding layers into an edge activation using an energy function pixel map, where the activation value responding to the pixel is larger than the activation value threshold, and the pixel is an edge pixel; obtaining an instance segmentation result by aggregating pixels belonging to the same instance based on the semantic labels in the semantic segmentation result, where the instance segmentation result includes a mask indicating the instance to which each pixel belongs; generating the human skeletal confidence map using the full convolutional network, and outputting the skeletal component labels to which each pixel belongs in each instance; and regressing locations of nodal points through the fully connected network to create a skeletal structure of the human body in each instance to obtain human pose information. This method relies on sensors and image feature extraction, which differs from the indirect inference of the present disclosure and produce different results.

Chinese Patent No. 108830150B (Application No. 201810426144.1) discloses a method and device for three-dimensional (3D) pose estimation of human body, including (S1) acquiring, by a monocular camera, depth images and red, green and blue (RGB) images of the human body at different angles; (S2): constructing a human skeletal key point detection neural network based on the RGB images to obtain a key point-annotated image; (S3) constructing a two-dimensional (2D)-3D mapping network of hand joint nodes; (S4) calibrating the depth image and the key point-annotated image of the human body at the same angle, and performing 3D point cloud coloring transformation on the corresponding depth image to obtain a coloring depth image; (S5) predicting, by predefined learning network, the corresponding position of the annotated human skeleton key points in the depth image based on the key point-annotated image and the coloring depth image; and (S6) combining the outputs of steps (S3) and (S5) to achieve refined estimation of 3D pose estimation of the human body. This method relies on sensors and image feature extraction, which differs from the indirect inference of the present disclosure and produce different results.

Chinese Patent Publication No. 109885163A (Application No. 201910122971.6) discloses a method and system for multiplayer interactive collaboration in virtual reality. The system includes a motion acquisition device to acquire skeletal data of a user; a plurality of clients for data modeling to obtain pose data of the user based on the skeletal data and mapping it to initial joint position data of each joint point of the skeletal model, and a server used to bind the initial joint position data of the skeletal model to the scene character of the user and obtain and synchronously transmit the character position data to other scene characters. The clients are also used to update the initial joint position data of the scene character, and combine with the model animation of the virtual scene to form the skeletal animation of pose movement. Although this method involves interaction and action, it is different from the indirect inference method provided in the present disclosure in purposes of interaction, generation modes of actions, and sources of dependence of landing points.

Chinese Patent Publication No. 112926550A (Application No. 202110406810.7) discloses a human-computer interaction method based on 3D image pose matching of human and an apparatus thereof. The method includes: initializing an interaction machine and storing corresponding a 3D image of a template pose into the interaction machine based on interaction requirements; acquiring a plurality of nodes based on a deep learning method and constructing a 3D skeleton model based on the plurality of nodes; obtaining skeleton information of the current to-be-interacted human and inputting it into the 3D skeleton model to obtain human pose features; calculating a loss function value between the human pose features and the interaction data set; and comparing the loss function value with the set threshold value to determine whether to carry out human-machine interaction. By using this method and apparatus, the use experience of human-machine interaction function can be improved. Although this method involves interaction and action, it is different from the indirect inference method provided in the present disclosure in purposes of interaction, generation modes of actions, and sources of dependence of landing points.

Chinese Patent Publication No. 110675474A (Application No. 201910758741.9) discloses a learning method of a virtual character model, an electronic device and a readable storage medium. The learning method for the virtual character model includes: obtaining a first skeletal pose information corresponding to an action of a target character in a current video image frame; obtaining skeletal pose adjustment information of a virtual character model corresponding to the current video image frame based on the first skeletal pose information and a second skeletal pose information, where the second skeletal pose information is the skeletal pose information of the virtual character model corresponding to a previous video image frame; driving the virtual character model according to the skeletal pose adjustment information for the virtual character model to learn the action of the target character in the current video image frame, so that the learning process between the virtual character model and a person can be simulated to form interactive experiences between a person and a virtual character, such as training, education, and nurturing. Although this method involves interaction and action, it is different from the indirect inference method provided in the present disclosure in purposes of interaction, generation modes of actions, and sources of dependence of landing points.

Chinese Patent Publication No. 113158459A (Application No. 202110422431.7) discloses a method for human pose estimation based on fusion of vision and inertial information. Since the human pose estimation method based on 3D vision sensors cannot provide three-degree-of-freedom rotation information, in this method, by using the complementary nature of visual and inertial information, a nonlinear optimization method is used to adaptively fuse vision information, inertial information and human pose priori information to obtain the rotation angle of a skeletal node and the global position of a root skeletal node at each moment, and complete real-time estimation for poses of the human body. Although this method involves interaction and action, it is different from the indirect inference method provided in the present disclosure in purposes of interaction, generation modes of actions, and sources of dependence of landing points.

Chinese Patent No. 108876815B (application number: 201810403604.9) discloses a skeletal pose calculation method, a virtual character model driving method, and a storage medium, where the skeletal pose calculation method is a key step of the virtual character model driving method, which includes an iterative calculation process for skeletal poses based on inverse kinematics. Based on inverse derivation, the joint angle change of the middle joint of the human skeletal chain is calculated based on the change of pose information of the limb, so that the joint angle of each joint is close to the optimal value after each iteration, effectively ensuring the smooth gradation effect when simulating the limb action and thus meeting the application requirements of realistic simulation of limb action. In addition, multiple judgment mechanisms are adopted in the iterative calculation process, which can update the change in the angle of each joint and in the pose information of the limb in time for the next iteration, simplifying the judgment process and ensuring the effectiveness of the iterative cycle, facilitating the calculation speed of the system while ensuring the correct calculation results, and enhancing the real-time nature of the limb movement capture process. Although this method involves pose prediction and action generation, it is different from the indirect inference method provided in the present disclosure in generation modes of actions, data sources, and sources of dependence of landing points. Moreover, this publication actually relates to the optimization method for fast skeleton calculation, which aims to improve the continuity smooth of the animation, and the virtual character is also presented as the landing point. By contrast, in the present disclosure, the rotation and movement of the intelligent device are visible, while the invisible twin human body is intended to be used as a constraint and mapping to solve the logical intermediate link that is transformed into the indirect inference of the pose setting. Besides, when the final output is used on applications, it can be used in the virtual character in a rendering form or used for application simulation demonstration. Hence, the mapping relationship between the twin human body and the virtual human part is a visualization constraint.

SUMMARY

An object of the present disclosure is to provide a method and system for twin pose detection based on interactive indirect inference to overcome the deficiencies in the prior art.

In a first aspect, this application provides a twin pose detection method based on interactive indirect inference, comprising:
  (S1) acquiring, by a plurality of sensors on a mobile phone, a data set in real time; and obtaining poses of individual parts of a skeleton of an object by reasoning using a plurality of reasoners on individual parts of the skeleton based on the data set and a preferred way of the object for using the mobile phone;
  (S2) merging the poses obtained in step (S1) to generate a plurality of initial virtual skeletons;
  (S3) under a predetermined human mechanics constraint, obtaining a plurality of overall virtual skeletons satisfying the predetermined human mechanics constraint from the plurality of initial virtual skeletons; and
  (S4) screening a predetermined number of overall virtual skeletons from the plurality of overall virtual skeletons, and obtaining a dynamic twin virtual pose in real time by reasoning on the predetermined number of overall virtual skeletons using an overall skeleton reasoner.

In some embodiments, the plurality of reasoners comprise a reasoner for left-hand motion, a reasoner for right-hand motion, a left-arm reasoner, a reasoner for right-arm motion, a reasoner for torso motion, a reasoner for head motion, a reasoner for left-leg motion and a reasoner for right-leg motion.

In some embodiments, the plurality of sensors comprise the nine-axis gyroscope, the acceleration sensor, the speed sensor, the infrared distance sensor, the touch sensor and the sensor capable of obtaining reference information about program operation of the mobile phone;
  the nine-axis gyroscope is configured to acquire a rotation angle of the mobile phone;
  the acceleration sensor is configured to acquire a horizontal movement acceleration of the mobile phone;
  the speed sensor is configured to acquire a horizontal movement speed of the mobile phone;
  the infrared distance sensor is configured to acquire an altitude of the mobile phone;
  the touch sensor is configured to acquire status information on whether a screen of the mobile phone is clicked; and
  the sensor capable of obtaining the program operation reference information of the mobile phone is configured to determine a use state the mobile phone.

In some embodiments, in step (S3), the predetermined body mechanics constraint is performed through steps of:
  (S3.1) acquiring a predetermined number of unconventional human pose images that meet predetermined requirements;
  (S3.2) extracting three-dimensional (3D) coordinates and pose data of virtual skeletal location points in Euclidean space based on the predetermined number of unconventional human pose images; and
  (S3.3) correcting constraint tolerance of human natural engineering mechanics based on the 3D coordinates and pose data obtained in step (S3.2);
  wherein the human natural engineering mechanics is in accordance with natural category of physiological movements, and comprises physiological bending of the human body, coherence and connection of physiological structures of the human body and bending of joints of the human body.

In some embodiments, step (S3) is performed by a step of:
subjecting the plurality of initial virtual skeletons to constraint combination and normalization to obtain the plurality of overall virtual skeletons conforming to the constraints.

In a second aspect, this application provides a twin pose detection system based on interactive indirect inference, comprising:
a first module;
a second module;
a third module; and
a fourth module;
wherein the first module is configured to perform reasoning to obtain poses of individual parts of a skeleton of an object using a plurality of reasoners on individual parts of the skeleton according to a preferred way of an object for using a mobile phone and a data set acquired in real time by a plurality of sensors on the mobile phone;
the second module is configured to merge the poses of individual parts of the skeleton to generate a plurality of initial virtual skeletons;
the third module is configured, under a predetermined human mechanics constraint, to obtain a plurality of overall virtual skeletons satisfying the predetermined human mechanics constraint from the plurality of initial virtual skeletons; and
the fourth module is configured to screen a predetermined number of overall virtual skeletons from the plurality of overall virtual skeletons, and perform reasoning on the predetermined number of overall virtual skeletons by using an overall skeleton reasoner to obtain a dynamic twin virtual pose in real time;
the first module comprises a first submodule and a second submodule;
wherein the first submodule is configured to construct a training set based on the data set and the poses of individual parts of the skeleton during human-computer interaction; wherein the plurality of sensors comprise a nine-axis gyroscope, an acceleration sensor, a speed sensor, an infrared distance sensor, a touch sensor and a sensor capable of obtaining program operation reference information of the mobile phone; and
the second submodule is configured to label and classify the training set based on the preferred way, and train the plurality of reasoners based on training sets in different multi-modal types; wherein the preferred way of the object for using the mobile phone comprises using left hand as a dominant hand and using right hand as a dominant hand.

In some embodiments, the plurality of reasoners comprise a reasoner for left-hand motion, a reasoner for right-hand motion, a left-arm reasoner, a reasoner for right-arm motion, a reasoner for torso motion, a reasoner for head motion, a reasoner for left-leg motion and a reasoner for right-leg motion.

In some embodiments, the plurality of sensors comprise the nine-axis gyroscope, the acceleration sensor, the speed sensor, the infrared distance sensor, the touch sensor and the sensor capable of obtaining program operation reference information of the mobile phone;
the nine-axis gyroscope is configured to acquire a rotation angle of the mobile phone;
the acceleration sensor is configured to acquire a horizontal movement acceleration of the mobile phone;
the speed sensor is configured to acquire a horizontal movement speed of the mobile phone;
the infrared distance sensor is configured to acquire an altitude of the mobile phone;
the touch sensor is configured to acquire status information on whether a screen of the mobile phone is clicked; and
the sensor capable of obtaining the program operation reference information of the mobile phone is configured to determine a use state the mobile phone.

In some embodiments, the predetermined body mechanics constraint is performed by using a fifth module, a sixth module, and a seventh module;
the fifth module is configured to acquire a plurality of unconventional human pose images that meet predetermined requirements;
the sixth module is configured to extract 3D coordinates and pose data of virtual skeletal location points in Euclidean space based on the plurality of unconventional human pose images; and
the seventh module is configured to correct constraint tolerance of human natural engineering mechanics based on the 3D coordinates and pose data;
wherein the human natural engineering mechanics is in accordance with natural category of physiological actions, and comprises physiological bending, coherence and connection of physiological structures and joint bending.

In some embodiments, the third module is configured to perform normalization on the plurality of initial virtual skeletons under the predetermined human mechanics constraint to obtain the plurality of overall virtual skeletons satisfying the predetermined human mechanics constraint.

Compared with the prior art, the beneficial effects of the present disclosure are described below.
(1) By using the method provided herein, the change process of the poses of the human body can be reasoned indirectly through the intrinsic sensors of the smart mobile device by combining with the pose inertia of the user and relying on the body of relation between twin human joints and the device.
(2) In this application, additional helmets, handles, external fit sensors and independent external cameras are not required for pose detection and generation. In contrast, the sensors on the mobile smart device, such as gyroscope, acceleration, level, geomagnetic, and touch screen sliding, are used to directly generate virtual poses based on the relative spatial relationship of the interaction used by the user, and then the physical poses are indirectly detected.
(3) Based on the data obtained from the intrinsic sensors of the mobile phone, reasoning is performed by using the reasoner for individual parts of the human skeleton, combined with human mechanics constraints and the overall skeletal reasoner such that the accuracy of reasoning is improved.
(4) correcting the constraint tolerance of the natural engineering mechanics of the human body based on unconventional pose, thus improving the accuracy of inference;
(5) The corresponding preferred reasoner is trained by selecting the corresponding data set based on personal preferred mobile phone, which improves the accuracy of reasoning;

(6) The virtual pose detection results are transformed into a physique virtual skeleton which is then provided for use in ecological applications.

BRIEF DESCRIPTION OF THE DRAWINGS

Other features, objects and advantages of the present disclosure will be more apparent according to the detailed description of non-limiting embodiments made with reference to the following accompanying drawings.

DETAILED DESCRIPTION OF EMBODIMENTS

The present disclosure is described in detail below with reference to specific embodiments. The following embodiments can help those of skill in the art to further understand the present disclosure, but are not intended to limit the present disclosure in any way. It should be noted that to one of ordinary skill in the art can make several variations and improvements without departing from the conception of the present disclosure, and these variations and improvements shall fall within the scope of protection of the present disclosure.

In the prior art, sensors are used to obtain an accurate correspondence of judgement through direct acquisition, for example, the speed sensor is used to obtain speed. In the present disclosure, a set of relevant sensing information is used for indirect reasoning. As there is a great repetition and indirect generation of sensing due to human behavior and use, the obtained basic sensing is different due to different time space and poses. The indirect reasoning acquires the most possible information about time space and pose through the basic sensor and avoids the use of additional and unreachable sensing equipment.

Embodiment 1

Figure 1:
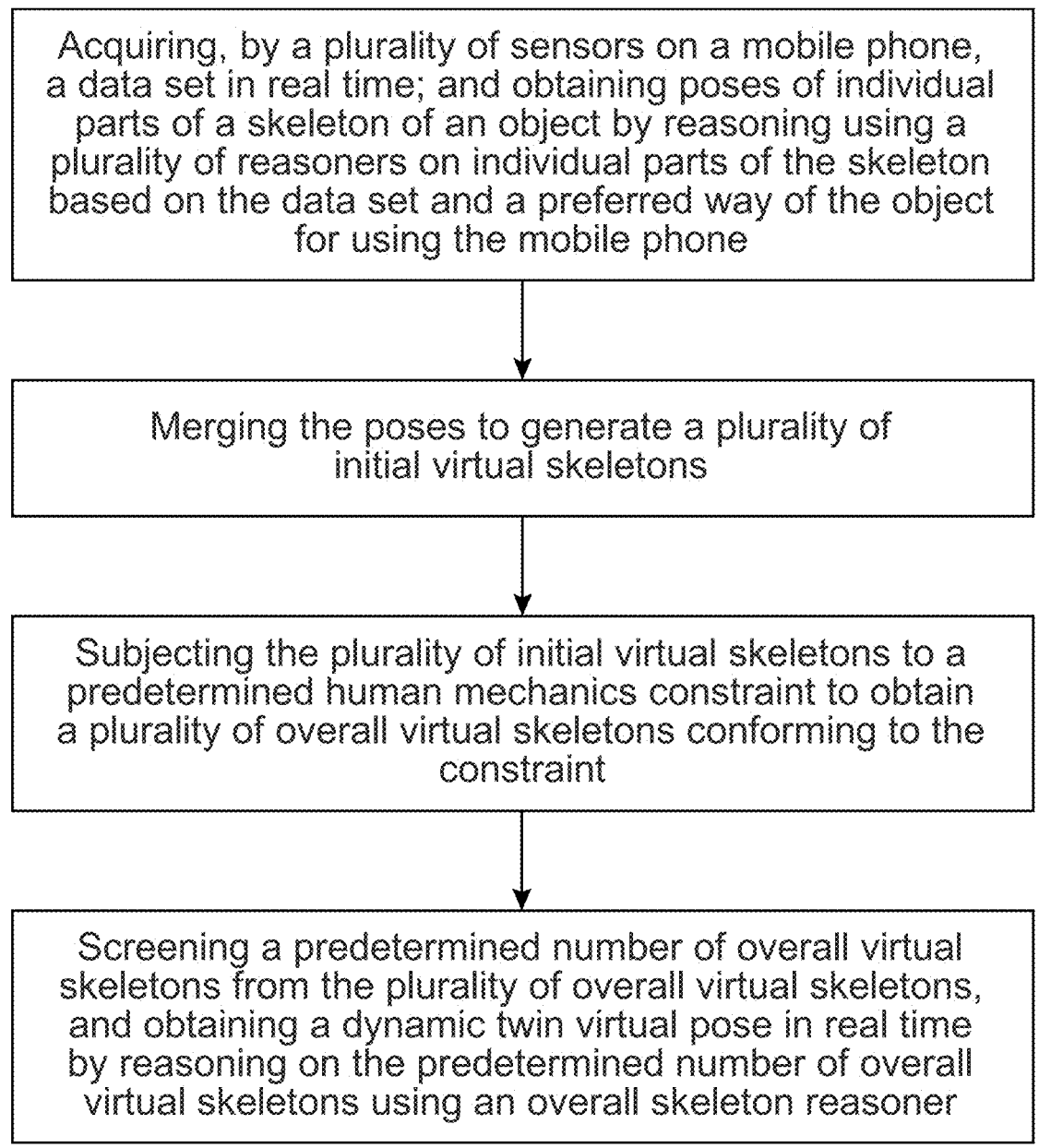
FIG. 1 is a flow chart of a twin pose detection method based on interactive indirect inference according to an embodiment of the present disclosure.
Figure 2:
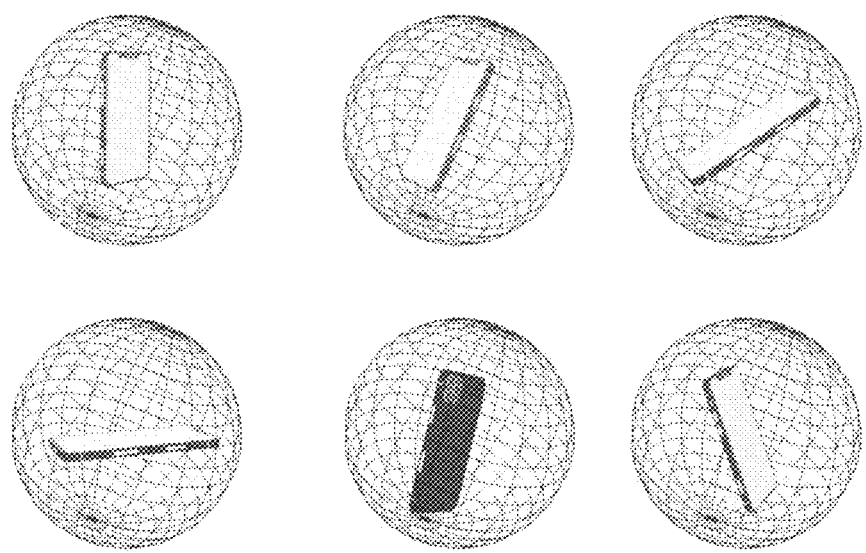
FIG. 2 is a schematic diagram of rotation of a mobile intelligent terminal under normal gravitational gravity, where a limb behavior is temporary skeletal extension.

The rotational change of the device as shown in FIG. 2 is not just its own rotation in the full 720° three-dimensional (3D) space, the change in pose of the device is caused by the skeletal linkage of the user. By using the method and system for twin pose detection based on interactive indirect inference provided in the present disclosure, this 3D spatial rotation is mapped into several twin body states of the twin being used.

Referring to FIGS. 1-9, this application provides a twin pose detection method based on interactive indirect inference, which includes the following steps.

(S1) During human-computer interaction, a training set is constructed based on the data set obtained by a plurality of sensors on a mobile phone and poses of individual parts of a skeleton.

Specifically, the plurality of sensors on the mobile phone include a nine-axis gyroscope, an acceleration sensor, a speed sensor, an infrared distance sensor, a touch sensor and a sensor capable of obtaining program operation reference information of the mobile phone (e.g., a screen brightness acquisition sensor, a sensor for acquisition of masking light sensing, and a speaker).

The data set obtained by the plurality of sensors on the mobile phone includes a rotation angle of the mobile phone obtained by a nine-axis gyroscope, a horizontal movement acceleration of the mobile phone obtained by an acceleration sensor, a horizontal movement speed of the mobile phone obtained by a speed sensor, an altitude of the mobile phone obtained by infrared distance sensor, status information about whether a screen of the mobile phone is clicked obtained by a touch sensor, and a state of use of the mobile phone discriminated by a sensor capable of obtaining the reference information about program operation (such as non-clicked while being used or watched).

Specifically, the poses of individual parts of human skeleton include hand poses, arm poses, torso poses, head poses, and leg poses.

The hand poses include a lift of the mobile phone by the left hand, a lift of the mobile phone by the right hand, and a lift of the mobile phone by both the left hand and the right hand.

The arm poses include a raised-arm pose and a dropped-arm pose.

The torso poses include an upright pose, a sitting pose, a squatting pose, and a lying pose, further include a forward leaning upright pose, an upright standing pose, a forward leaning sitting pose, a back leaning sitting pose, an upright sitting pose, a squatting pose, a facing-upward lying pose, and a facing-downward lying pose.

The head poses include a looking-straight ahead pose, a looking-left pose, a looking-right pose, a looking-up pose, and a looking-down pose.

The leg poses include a walking pose, a travelling pose, a sitting pose, a standing pose, and a lying pose.

(S2) The training set is labeled and classified based on the preferred ways of the mobile phone, and a plurality of reasoners for individual pars of human skeleton are trained based on training sets in different multi-modal types.

Specifically, the preferred ways for the mobile phone include the way of using the left hand as a usual hand and the way of using the right hand as the usual hand.

The plurality of reasoners include a reasoner for left-hand motion, a reasoner for right-hand motion, a left-arm reasoner, a reasoner for right-arm motion, a reasoner for torso motion, a reasoner for head motion, a reasoner for left-leg motion and a reasoner for right-leg motion.

(S3) During human-computer interaction, an overall skeletal reasoner is trained, and the corresponding weights are obtained by the overall skeletal reasoner based on input overall skeletal poses.

Figure 3:
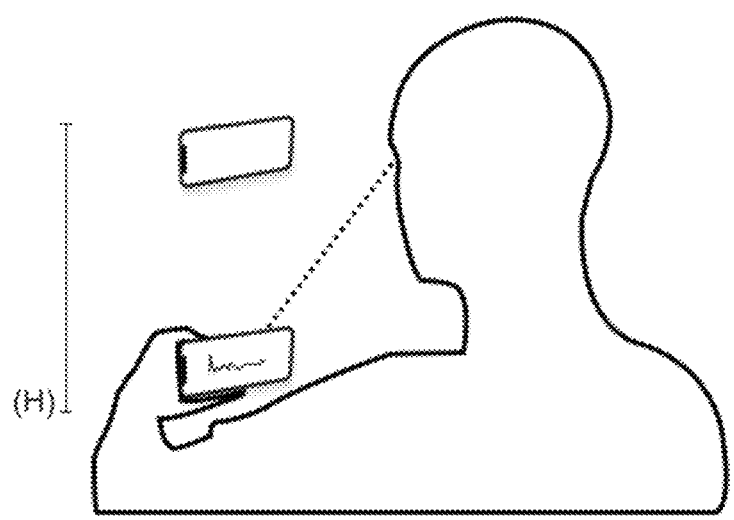
FIG. 3 schematically shows an inference of a pose of human skeleton according to an embodiment of the present disclosure.
Figure 4:
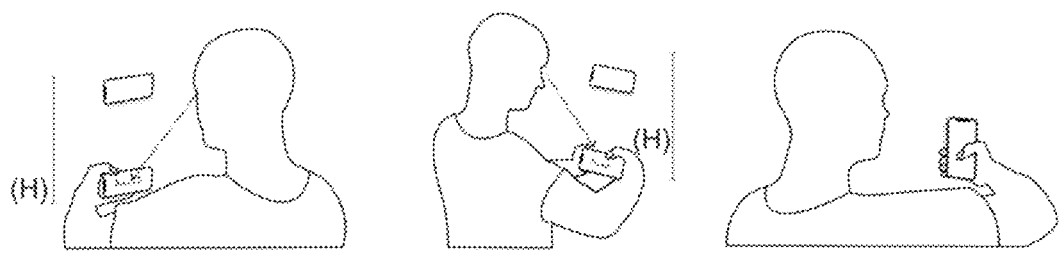
FIG. 4 schematically shows an inference of a pose of the human skeleton according to an embodiment of the present disclosure.

(S4) The data set is acquired by the plurality of sensors on the mobile phone in real-time. The reasoning is performed by the plurality of reasoners for individual parts of human skeleton based on preferred way of the object for using the mobile phone and the data set to obtain preferred poses of the individual parts of the human skeleton;

In an embodiment, as shown in FIGS. 3 and 4, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, and status information about whether the screen of the mobile phone is clicked and whether the mobile phone has a certain amount of continuous vibration. Then whether the current lifting left hand, right hand or both hands is reasoned by the corresponding preferred reasoner for left-hand motion and the right-handed part reasoner.

Specifically, the reasoning process is performed as follows. Based on the information collected by the sensors on the mobile phone, including: there is no horizontal and vertical displacement; as detected by the gyroscope, an angle between the screen display plane and a vertical plane of the ground is ±15°; the mobile phone is not at sea or on an aircraft according to the location information; and the mobile phone is continuously on the lighted screen without being touched, and there is a certain continuous vibration, it can be reasoned by the left-handed reasoner and the right-handed reasoner that the currently-raised hand is the non-dominant hand, and otherwise, the currently-raised hand is the dominant hand. The threshold for determining the quantitative vibration is determined by initializing the learning of operational preferences of the user, during which the user is allowed to hold the screen continuously to detect the difference in the habitual shaking of the hands. When the plurality of sensors of the mobile phone fail to detect the touch operation, there is a minimal amount of micro-vibration and it is not sensor noise. When the mobile phone is detected in a landscape mode, then it is reasoned by the hand reasoner that the both hands are raised to hold the mobile phone. When the mobile phone is detected in a portrait mode, it is reasoned by the hand reasoner that the single commonly used hand is raised.

Figure 5:
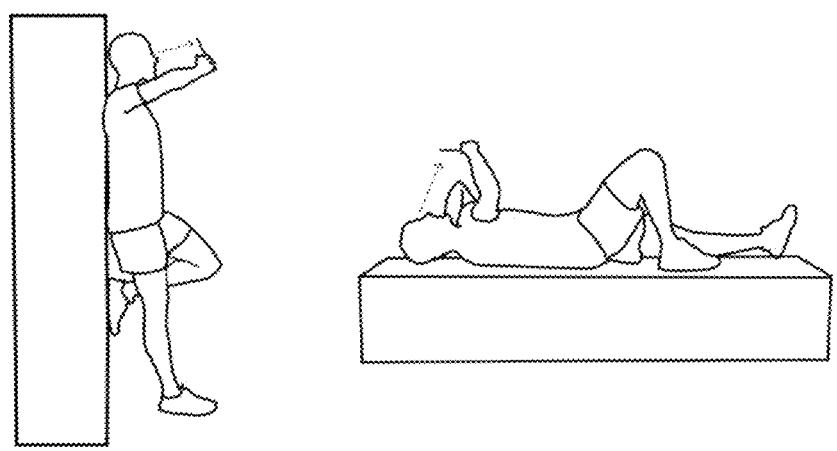
FIG. 5 schematically shows an inference of a pose of the human skeleton according to an embodiment of the present disclosure.

In an embodiment, as shown in FIGS. 4 and 5, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground (an adult of normal height is taken as an example herein), and the angle between the normal of the screen plane and the ground. Then whether the current arm is in a raised or lowered position is reasoned by the corresponding preferred reasoner for left-arm motion and the reasoner for right-arm motion.

Specifically, the reasoning process includes the following steps. If the angle between the normal of the screen plane and the ground is more than 105° (that is, the user is most likely looking down at the screen), it is reasoned by the reasoner for left-arm motion and/or the reasoner for right-arm motion that the arm is in a dropped pose. If the angle between the normal of the screen plane and the ground is less than 75°, then tit is reasoned by the reasoner for left-arm motion and/or the reasoner for right-arm motion that the arm is in a raised pose.

Figure 6:
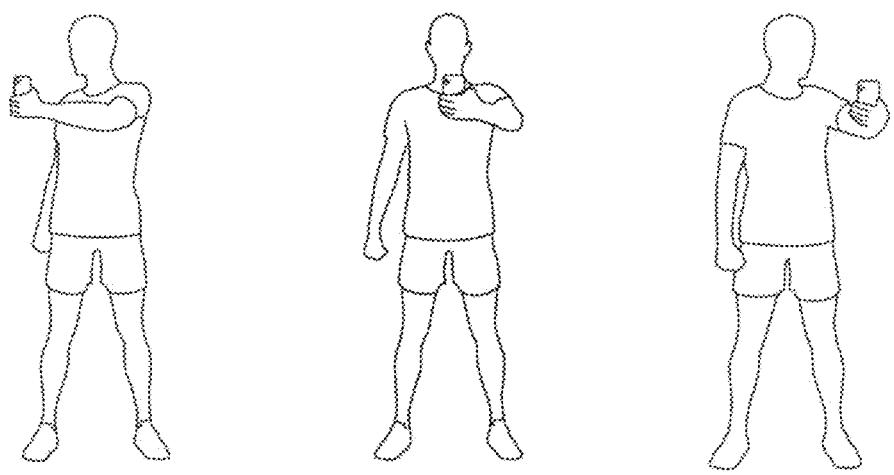
FIG. 6 schematically shows an inference of a pose of the human skeleton according to an embodiment of the present disclosure.
Figure 8:
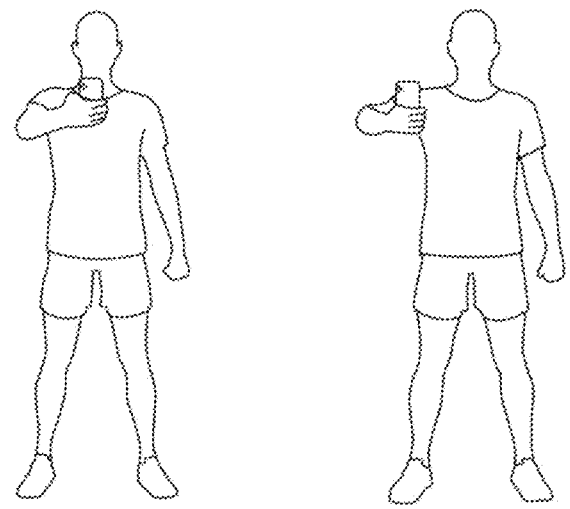
FIG. 8 schematically shows an inference of a pose of the human skeleton according to an embodiment of the present disclosure.

In an embodiment, as shown in FIGS. 5, 6 and 8, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground, the angle between the normal of the screen plane and the ground, and the orientation of the screen. Then the torso is reasoned by the corresponding preferred reasoner for torso motion to be in a forward leaning upright pose, an upright standing pose, a forward leaning sitting pose, a backward leaning sitting pose, an upright sitting pose, a squatting pose, an upward facing lying pose or a downward facing lying pose.

Specifically, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground, the angle between the normal of the screen plane and the ground, and the orientation of the screen. Then the torso is reasoned to be in an upright pose, a sitting pose or a squatting pose according to the angle between the normal of the screen plane and the ground, and is further reasoned be in a forward leaning upright pose, an upright standing pose, a forward leaning sitting pose, a back leaning sitting pose, an upright sitting pose, a squatting pose, an upward facing lying pose or a downward facing lying pose.

Figure 9:
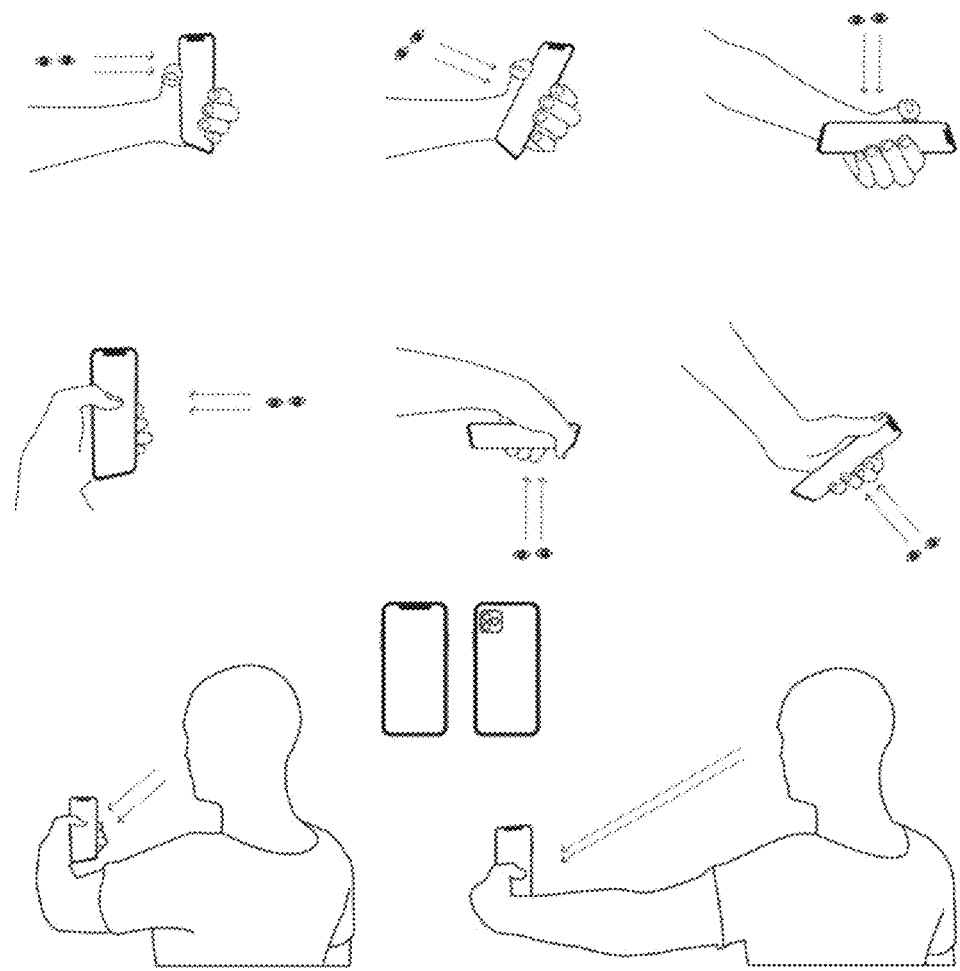
FIG. 9 schematically shows an inference of a pose of the human skeleton according to an embodiment of the present disclosure.

Specifically, as shown in FIG. 9, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground, the angle between the normal of the screen plane and the ground, and the orientation of the screen. The head poses consistent with the torso poses are inferred by the corresponding preferred reasoner for head motion. The initial pose of the head is a straight sight. The head pose also includes a changing pose, which depends on the opposite direction of the sliding of the screen. When the screen slides to the right, the sight turns towards the left. The head movement is currently considered to be synchronized with the eye movement, so the sight towards the left is equivalent to the head pose being towards the left.

Figure 7:
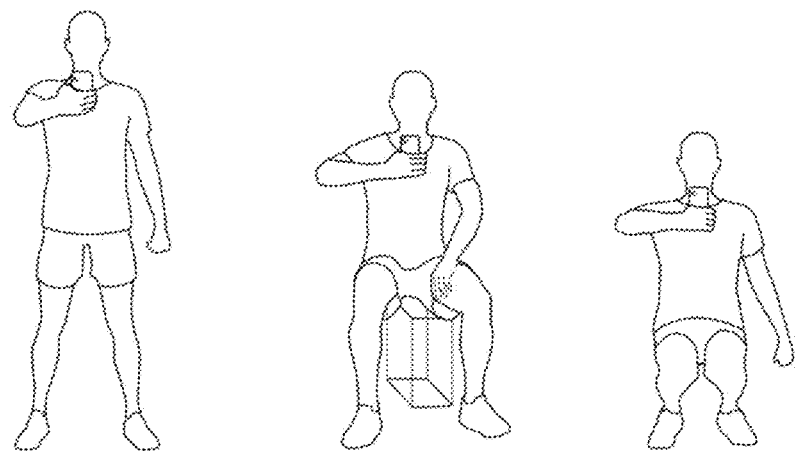
FIG. 7 schematically shows an inference of a pose of the human skeleton according to an embodiment of the present disclosure.

Specifically, as shown in FIG. 7, the data set acquired by the plurality of sensors includes displacement variation, displacement velocity, vibration of the mobile phone and the pressure altitude of the mobile phone from the ground. Then the leg pose is reasoned by the corresponding preferred leg reasoner.

More specifically, according to the pressure altitude of the mobile phone with respect to the ground, it is reasoned that the user is in a standing pose. In the case of continuous displacement change and no shaking and vibration, it is reasoned by the reasoner for leg motion that the user is in a travelling pose. When the mobile phone is under shaking and vibration, and the displacement velocity is within the walking speed range, it is inferred by the reasoner for leg motion that the user is in a walking pose.

(S5) The preferred poses of individual parts of the human skeleton are merged to generate a plurality of initial virtual skeletons.

(S6) The plurality of initial virtual skeletons are subjected to a predetermined human mechanics constraint to obtain a plurality of overall virtual skeletons satisfying the predetermined human mechanics constraint from the plurality of initial virtual skeletons.

Specifically, the predetermined human mechanics constraint is performed through the following steps.

(S6.1) A predetermined number of unconventional human pose images that meet predetermined requirements are acquired.

(S6.2) 3D coordinates and pose data of virtual skeletal location points in Euclidean space are extracted based on the predetermined number of unconventional human pose images, where the origin of the 3D coordinates in Euclidean space of the virtual skeleton positioning points is the original position where the reasoning of the virtual skeleton is started, i.e. the 3D coordinate system in Euclidean space of the virtual skeleton positioning points is the reasoned 3D coordinate system of the virtual skeleton.

(S6.3) Constraint tolerance of human natural engineering mechanics is corrected based on the 3D coordinates and pose data obtained in step (S6.2);

The human natural engineering mechanics is in accordance with natural category of physiological actions, and includes physiological bending of the human body, coherence and connection of physiological structures of the human body and joint bending.

More specifically, step (S5) is performed by the following step. The plurality of initial virtual skeletons are subjected to constraint combination and normalization to obtain the plurality of overall virtual skeletons conforming to the constraints.

(S7) The screened overall virtual skeletons are reasoned with the overall skeletal reasoner to obtain a dynamic twin virtual pose in real time. The dynamic twin virtual pose is presented in the form of skeleton animation time-series collection.

Specifically, the screened overall virtual skeletons are subjected to weighting by the overall skeletal reasoner, and the one with the highest weight is selected as the twin virtual pose.

This application also provides a twin pose detection system based on interactive indirect inference, which includes a module M1, a module M2, a module M3, and a module M4.

The module M1 is configured to construct a training set based on the data set and the poses of individual parts of the skeleton during human-computer interaction; where the plurality of sensors include a nine-axis gyroscope, an acceleration sensor, a speed sensor, an infrared distance sensor, a touch sensor and a sensor capable of obtaining program operation reference information of the mobile phone.

Specifically, the sensors of the mobile phone include the nine-axis gyroscope, the acceleration sensor, the speed sensor, the infrared distance sensor, the touch sensor and the sensor capable of obtaining program operation reference information of the mobile phone.

The data set by the sensors of the mobile phone includes a rotation angle of the mobile phone obtained by a nine-axis gyroscope, a horizontal movement acceleration of the mobile phone obtained by an acceleration sensor, a horizontal movement speed of the mobile phone obtained by a speed sensor, an altitude of the mobile phone obtained by infrared distance sensor, status information about whether a screen of the mobile phone is clicked obtained by a touch sensor, and a state of use of the mobile phone discriminated by a sensor capable of obtaining the reference information about program operation (such as non-clicked while being used or watched).

Specifically, the poses of individual parts of human skeleton include hand poses, arm poses, torso poses, head poses, and leg poses.

The hand poses include a raise of the mobile phone by the left hand, a raise of the mobile phone by the right hand, and a raise of the mobile phone by both the left hand and the right hand.

The arm poses include a raised-arm pose and a dropped-arm pose.

The torso poses include an upright pose, a sitting pose, a squatting pose, and a lying pose, further include a forward leaning upright pose, an upright standing pose, a forward leaning sitting pose, a back leaning sitting pose, an upright sitting pose, a squatting pose, an upward facing lying pose, and a downward facing lying pose.

The head poses include a looking-straight pose, a looking-left pose, a looking-right pose, a looking-up pose, and a looking-down pose.

The leg poses include a walking pose, a travelling pose, a sitting pose, a standing pose, and a lying pose.

The module M2 is configured to label and classify the training set based on the preferred way, and train the plurality of reasoners based on training sets in different multi-modal types.

Specifically, the preferred way of using the mobile phone include using the left hand as a dominant hand and using the right hand as a dominant hand.

The reasoners include a reasoner for left-hand motion, a reasoner for right-hand motion, a left-arm reasoner, a reasoner for right-arm motion, a reasoner for torso motion, a reasoner for head motion, a reasoner for left-leg motion and a reasoner for right-leg motion.

The module M3 is configured to train the overall skeletal reasoner during the human-computer interaction, and obtain the corresponding probabilities by the overall skeletal reasoner based on the input overall skeletal pose.

The module M4 is configured to perform reasoning to obtain poses of individual parts of a skeleton of an object using a plurality of reasoners on individual parts of the skeleton according to a preferred way of an object for using a mobile phone and a data set acquired in real time by a plurality of sensors on the mobile phone.

In an embodiment, as shown in FIGS. 3 and 4, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, and status information about whether the screen of the mobile phone is clicked and whether the mobile phone has a certain amount of continuous vibration. Then whether the currently raised is left hand, right hand or both hands is reasoned by the corresponding reasoner for left-hand motion and the reasoner for right-hand motion.

Specifically, the reasoning process includes the following steps. There is no horizontal and vertical displacement. The gyroscope detects that the angle of the screen display plane on the vertical ground is ±15°. The mobile phone is not at sea or in an aircraft from the positioning information. The mobile phone is continuously on the lighted screen and not in touch, and there is a continuous amount of vibration during the process. Then the reasoner for left-hand motion and the reasoner for right-hand motion reason that the currently lifted hand is the infrequently used hand, and otherwise, the currently lifted hand is the frequently used hand. The threshold for determining the quantitative vibration is determined by initializing the learning of operational preferences of the user, during which the user is allowed to hold the screen continuously to detect the difference in the habitual shaking of the hands. When the plurality of sensors of the mobile phone fail to detect the touch operation, there is a minimal amount of micro-vibration and it is not sensor noise. When the mobile phone is detected in a landscape mode, then it is reasoned by the hand reasoner that the both hands are raised to hold the mobile phone. When the mobile phone is detected in a portrait mode, it is reasoned by the hand reasoner that the single commonly used hand is lifted.

In an embodiment, as shown in FIGS. 4 and 5, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone experiences certain continuous vibration, the pressure altitude of the mobile phone relative to the ground (an adult of normal height is taken as an example herein), and the angle between the normal of the screen plane and the ground. Then whether the current arm is in a raised or lowered position is reasoned by the corresponding preferred reasoner for left-arm motion and the reasoner for right-arm motion.

Specifically, the reasoning includes the following steps. If the angle between the normal of the screen plane and the ground is more than 105°, and the user is looking down at the screen, it is reasoned by the reasoner for left-arm motion and/or the reasoner for right-arm motion that the arm is in a dropped pose. If the angle between the normal of the screen plane and the ground is less than 75°, it is reasoned by the reasoner for left-arm motion and/or the reasoner for right-arm motion that the arm is in a raised pose.

In an embodiment, as shown in FIGS. 5, 6 and 8, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground, the angle between the normal of the screen plane and the ground, and the orientation of the screen. Then the torso is reasoned by the corresponding preferred reasoner for torso motion to be in a forward leaning upright pose, an upright standing pose, a forward leaning sitting pose, a backward leaning sitting pose, an upright sitting pose, a squatting pose, an upward facing lying pose or a downward facing lying pose.

Specifically, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground, the angle between the normal of the screen plane and the ground, and the orientation of the screen. Then the torso is reasoned to be in an upright pose, a sitting pose or a squatting pose according to the angle between the normal of the screen plane and the ground, and is further reasoned be in a forward leaning upright pose, an upright standing pose, a forward leaning sitting pose, a back leaning sitting pose, an upright sitting pose, a squatting pose, an upward facing lying pose or a downward facing lying pose.

Specifically, as shown in FIG. 9, the data set acquired by the plurality of sensors includes the horizontal and vertical displacement, the rotation angle of the mobile phone detected by the gyroscope detection, the angle of the screen display plane on the vertical ground detected by the gyroscope detection, positioning information, status information about whether the screen of the mobile phone is clicked and whether the mobile phone has a certain amount of continuous vibration, the pressure altitude of the mobile phone from the ground, the angle between the normal of the screen plane and the ground, and the orientation of the screen. The head poses consistent with the torso poses are inferred by the corresponding preferred reasoner for head motion. The initial head pose is a straight sight. The head pose also includes a changing pose, which depends on the opposite direction of the sliding of the screen. When the screen slides to the right, the sight turns towards the left. The head movement is currently considered to be synchronized with the eye movement, so the sight towards the left is equivalent to the head pose being towards the left.

Specifically, as shown in FIG. 7, the data set acquired by the plurality of sensors includes displacement variation, displacement velocity, vibration of the mobile phone and the pressure altitude of the mobile phone from the ground. Then the leg pose is reasoned by the corresponding preferred leg reasoner.

More specifically, according to the pressure altitude of the mobile phone from the ground, to reason a standing pose. If the displacement changes continuous without vibration, the travelling pose is reasoned by the leg reasoner. When the mobile phone is shaking and vibrating, and the displacement velocity is within the walking speed range, then the walking pose is inferred by the leg reasoner.

The module M5 is configured to merge the poses of individual parts of the skeleton to generate a plurality of initial virtual skeletons.

The module M6 is configured, under a predetermined human mechanics constraint, to obtain a plurality of overall virtual skeletons satisfying the predetermined human mechanics constraint from the plurality of initial virtual skeletons.

The predetermined body mechanics constraint is performed by a module M6.1, a module M6.2, and a module M6.3.

The module M6.1 is configured to acquire a plurality of unconventional human pose images that meet predetermined requirements.

The module M6.2 is configured to extract 3D coordinates and pose data of virtual skeletal location points in Euclidean space based on the plurality of unconventional human pose images. The origin of the 3D coordinates in Euclidean space of the virtual skeleton positioning points is the original position where the reasoning of the virtual skeleton is started, i.e., the 3D coordinate system in Euclidean space of the virtual skeleton positioning points is the reasoned 3D coordinate system of the virtual skeleton.

The module M6.3 is configured to correct constraint tolerance of human natural engineering mechanics based on the 3D coordinates and pose data.

The human natural engineering mechanics is in accordance with natural category of physiological actions, and includes physiological bending, coherence and connection of physiological structures and joint bending.

More specifically, the module M5 is configured to allow the plurality of initial virtual skeletons to be subjected to constraint combination and normalization to obtain the plurality of overall virtual skeletons conforming to the constraints.

(S7) The screened overall virtual skeletons are reasoned with the overall skeletal reasoner to obtain a dynamic twin virtual pose in real time.

Specifically, the screened overall virtual skeletons are subjected to weighting by the overall skeletal reasoner, and the one with the highest weight is selected as the twin virtual pose.

It is known to those skilled in the art that, the system, device and individual modules provided herein can be implemented in purely computer-readable program code. Besides, it is possible to logically program the method steps such that the system, device and individual modules provided herein can be implemented in the form of logic gates, switches, special integrated circuits, programmable logic controllers and embedded microcontrollers. Therefore, the system, device and the individual modules provided herein can be considered as a hardware component and the modules included therein for implementing the various programs can be considered as structures within the hardware component. The modules for implementing the various functions can also be considered as structures that can be both software programs for implementing the method and structures within the hardware component.

Described above are specific embodiments of the present disclosure. It should be understood that the disclosure is not limited to the particular embodiments described above, and various variations or modifications made by a person skilled in the art without departing from the spirit and scope of the disclosure shall fall within the scope of the disclosure defined by the appended claims. The embodiments of the present application and the features therein may be combined with each other in any way without contradiction.

What is claimed is:

1. A twin pose detection method based on interactive indirect inference, comprising:
   (S1) acquiring, by a plurality of sensors on a mobile phone, a data set in real time; and obtaining poses of individual parts of a skeleton of an object by reasoning using a plurality of reasoners on individual parts of the skeleton based on the data set and a preferred way of the object for using the mobile phone;
   (S2) merging the poses obtained in step (S1) to generate a plurality of initial virtual skeletons;
   (S3) under a predetermined human mechanics constraint, obtaining a plurality of overall virtual skeletons satisfying the predetermined human mechanics constraint from the plurality of initial virtual skeletons; and
   (S4) screening a predetermined number of overall virtual skeletons from the plurality of overall virtual skeletons, and obtaining a dynamic twin virtual pose in real time by reasoning on the predetermined number of overall virtual skeletons using an overall skeleton reasoner;
   wherein step (S1) comprises:
   (S1.1) during human-computer interaction, constructing a training set based on the data set and the poses of individual parts of the skeleton; wherein the plurality of sensors comprise a nine-axis gyroscope, an acceleration sensor, a speed sensor, an infrared distance sensor, a touch sensor and a sensor capable of obtaining program operation reference information of the mobile phone; and
   (S1.2) labeling and classifying the training set based on the preferred way; training the plurality of reasoners based on training sets in different multi-modal types; wherein the preferred way of the object for using the mobile phone comprises using left hand as a dominant hand and using right hand as a dominant hand.

2. The twin pose detection method of claim 1, wherein the plurality of reasoners comprise a reasoner for left-hand motion, a reasoner for right-hand motion, a reasoner for left-arm motion, a reasoner for right-arm motion, a reasoner for torso motion, a reasoner for head motion, a reasoner for left-leg motion and a reasoner for right-leg motion.

3. The twin pose detection method of claim 1, wherein the nine-axis gyroscope is configured to acquire a rotation angle of the mobile phone;
   the acceleration sensor is configured to acquire a horizontal movement acceleration of the mobile phone;
   the speed sensor is configured to acquire a horizontal movement speed of the mobile phone;
   the infrared distance sensor is configured to acquire an altitude of the mobile phone;
   the touch sensor is configured to acquire status information about whether a screen of the mobile phone is clicked; and
   the sensor capable of obtaining the program operation reference information of the mobile phone is configured to determine a use state the mobile phone.

4. The twin pose detection method of claim 1, wherein in step (S3), the predetermined human mechanics constraint is performed through steps of:
   (S3.1) acquiring a predetermined number of unconventional human pose images that meet predetermined requirements;
   (S3.2) extracting three-dimensional (3D) coordinates and pose data of virtual skeletal location points in Euclidean space based on the predetermined number of unconventional human pose images; and
   (S3.3) correcting constraint tolerance of human natural engineering mechanics based on the 3D coordinates and pose data obtained in step (S3.2);
   wherein the human natural engineering mechanics is in accordance with natural category of physiological actions, and comprises physiological bending, coherence and connection of physiological structures and joint bending.

5. The twin pose detection method of claim 4, wherein step (S3) is performed by a step of:
   under the predetermined human mechanics constraint, subjecting the plurality of initial virtual skeletons to normalization to obtain the plurality of overall virtual skeletons satisfying the predetermined human mechanics constraint.

6. A twin pose detection system based on interactive indirect inference, comprising:
   a first module;
   a second module;

a third module; and a fourth module;

wherein the first module is configured to perform reasoning to obtain poses of individual parts of a skeleton of an object using a plurality of reasoners on individual parts of the skeleton according to a preferred way of an object for using a mobile phone and a data set acquired in real time by a plurality of sensors on the mobile phone;

the second module is configured to merge the poses of individual parts of the skeleton to generate a plurality of initial virtual skeletons;

the third module is configured, under a predetermined human mechanics constraint, to obtain a plurality of overall virtual skeletons satisfying the predetermined human mechanics constraint from the plurality of initial virtual skeletons; and the fourth module is configured to screen a predetermined number of overall virtual skeletons from the plurality of overall virtual skeletons, and perform reasoning on the predetermined number of overall virtual skeletons by using an overall skeleton reasoner to obtain a dynamic twin virtual pose in real time;

the first module comprises a first submodule and a second submodule;

wherein the first submodule is configured to construct a training set based on the data set and the poses of individual parts of the skeleton during human-computer interaction; wherein the plurality of sensors comprise a nine-axis gyroscope, an acceleration sensor, a speed sensor, an infrared distance sensor, a touch sensor and a sensor capable of obtaining program operation reference information of the mobile phone; and the second submodule is configured to label and classify the training set based on the preferred way, and train the plurality of reasoners based on training sets in different multi-modal types; wherein the preferred way of the object for using the mobile phone comprises using left hand as a dominant hand and using right hand as a dominant hand.

7. The twin pose detection system of claim 6, wherein the plurality of reasoners comprise a reasoner for left-hand motion, a reasoner for right-hand motion, a left-arm reasoner, a reasoner for right-arm motion, a reasoner for torso motion, a reasoner for head motion, a reasoner for left-leg motion and a reasoner for right-leg motion.

8. The twin pose detection system of claim 6, wherein the nine-axis gyroscope is configured to acquire a rotation angle of the mobile phone;

the acceleration sensor is configured to acquire a horizontal movement acceleration of the mobile phone;

the speed sensor is configured to acquire a horizontal movement speed of the mobile phone;

the infrared distance sensor is configured to acquire an altitude of the mobile phone;

the touch sensor is configured to acquire status information on whether a screen of the mobile phone is clicked; and the sensor capable of obtaining the program operation reference information of the mobile phone is configured to determine a use state of the mobile phone.

9. The twin pose detection system of claim 6, wherein the predetermined body mechanics constraint is performed by using a fifth module, a sixth module, and a seventh module;

the fifth module is configured to acquire a plurality of unconventional human pose images that meet predetermined requirements;

the sixth module is configured to extract 3D coordinates and pose data of virtual skeletal location points in Euclidean space based on the plurality of unconventional human pose images; and the seventh module is configured to correct constraint tolerance of human natural engineering mechanics based on the 3D coordinates and pose data;

wherein the human natural engineering mechanics is in accordance with natural category of physiological actions, and comprises physiological bending, coherence and connection of physiological structures and joint bending.

10. The twin pose detection system of claim 6, wherein the third module is configured to perform normalization on the plurality of initial virtual skeletons under the predetermined human mechanics constraint to obtain the plurality of overall virtual skeletons satisfying the predetermined human mechanics constraint.

* * * * *